(12) United States Patent
Watanabe

(10) Patent No.: US 11,187,424 B2
(45) Date of Patent: Nov. 30, 2021

(54) AIR-CONDITIONING APPARATUS

(71) Applicant: Mitsubishi Electric Corporation, Tokyo (JP)

(72) Inventor: Kazuki Watanabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 85 days.

(21) Appl. No.: 16/493,935

(22) PCT Filed: Jun. 15, 2017

(86) PCT No.: PCT/JP2017/022069
§ 371 (c)(1),
(2) Date: Sep. 13, 2019

(87) PCT Pub. No.: WO2018/229921
PCT Pub. Date: Dec. 20, 2018

(65) Prior Publication Data
US 2020/0300493 A1  Sep. 24, 2020

(51) Int. Cl.
*F24F 11/38* (2018.01)
*F24F 11/36* (2018.01)
*F24F 110/65* (2018.01)

(52) U.S. Cl.
CPC .............. *F24F 11/38* (2018.01); *F24F 11/36* (2018.01); *F24F 2110/65* (2018.01)

(58) Field of Classification Search
CPC ......... F24F 11/38; F24F 11/36; F24F 2110/65
See application file for complete search history.

(56) References Cited

U.S. PATENT DOCUMENTS

2008/0196489 A1    8/2008  Fukagai et al.
2017/0059185 A1*   3/2017  Suzuki ................. F25B 47/025
(Continued)

FOREIGN PATENT DOCUMENTS

CN    104977316 A    10/2015
JP    2007-017208 A   1/2007
(Continued)

OTHER PUBLICATIONS

Chinese Office Action dated Feb. 3, 2021, issued in corresponding Chinese Patent Application No. 201780091861.7 (and English Machine Translation).

(Continued)

*Primary Examiner* — Nelson J Nieves
(74) *Attorney, Agent, or Firm* — Posz Law Group, PLC

(57) ABSTRACT

An air-conditioning apparatus includes: a casing; a gas sensor placed in the casing and configured to produce a sensor output according to refrigerant concentration; a controller configured to detect refrigerant leakage by comparing the sensor output from the gas sensor with a first threshold used to check for refrigerant leakage; and an output device configured to issue an alarm. The controller causes the output device to issue an alarm when the sensor output from the gas sensor continues to be equal to or higher than a second threshold but lower than the first threshold higher than the second threshold for a predetermined set period, where the second threshold is set to a voltage lower than a limit voltage that indicates that sensitivity of the gas sensor has been reduced to zero by siloxane poisoning.

6 Claims, 4 Drawing Sheets

(56) References Cited

U.S. PATENT DOCUMENTS

2019/0072291 A1* 3/2019 Kamijo ................ F25B 49/005
2019/0072944 A1* 3/2019 Aoki ........................ F24F 11/56

FOREIGN PATENT DOCUMENTS

| JP | 2008-233065 | A |   | 10/2008 |            |
|----|-------------|---|---|---------|------------|
| JP | 2010-256049 | A |   | 11/2010 |            |
| JP | 2011-137719 | A |   | 7/2011  |            |
| JP | 2014-224612 | A |   | 12/2014 |            |
| JP | 2014235082  | A | * | 12/2014 |            |
| JP | 2016-090175 | A |   | 5/2016  |            |
| WO | 2013/038704 | A1|   | 3/2013  |            |
| WO | WO-2017002216 | A1 | * | 1/2017 | F24F 11/36 |
| WO | WO-2017179180 | A1 | * | 10/2017 | F24F 11/88 |

OTHER PUBLICATIONS

Extended European Search Report dated Jun. 2, 2020 issued in corresponding EP patent application No. 17914092.6.
Examination Report dated Jun. 26, 2020 issued in corresponding AU patent application No. 2017418267.

* cited by examiner

AIR-CONDITIONING APPARATUS

CROSS REFERENCE TO RELATED APPLICATION

This application is a U.S. national stage application of PCT/JP2017/022069 filed on Jun. 15, 2017, the contents of which are incorporated herein by reference.

TECHNICAL FIELD

The present invention relates to an air-conditioning apparatus equipped with a gas sensor configured to detect concentration of refrigerant gas.

BACKGROUND ART

Conventionally, a gas sensor configured to detect refrigerant leakage is provided in an air-conditioning apparatus. The air-conditioning apparatus equipped with this type of gas sensor has a function to diagnose abnormality of the gas sensor and inform a user about replacement time before failing to do normal detection due to the influence of aging deterioration and environmental stress (see, for example, Patent Literature 1).

CITATION LIST

Patent Literature

Patent Literature 1: Japanese Unexamined Patent Application Publication No. 2008-233065

SUMMARY OF INVENTION

Technical Problem

For example, in beauty parlors and other similar establishments, products containing siloxane (Si group), such as hair sprays and conditioners, are used routinely. In a siloxane environment in which a large amount of siloxane exists, gas sensors may not function normally due to siloxane poisoning.

However, Patent Literature 1 does not discuss deterioration of gas sensors resulting from siloxane poisoning. Consequently, there is a problem in that even if a gas sensor has reached the end of its service life due to siloxane poisoning, the user may continue using the gas sensor without realizing the service-life expiration and refrigerant leakage may not be detected.

The present invention has been made to overcome the above problem and has an object to provide an air-conditioning apparatus capable of raising an alarm when a gas sensor approaches the end of its service life due to siloxane poisoning.

Solution to Problem

An air-conditioning apparatus according to an embodiment of the present invention comprises: a casing; a gas sensor placed in the casing and configured to produce a sensor output according to refrigerant concentration; a controller configured to detect refrigerant leakage by comparing the sensor output from the gas sensor with a first threshold used to check for refrigerant leakage; and an output device configured to issue an alarm, wherein the controller causes the output device to issue an alarm when the sensor output from the gas sensor continues to be equal to or higher than a second threshold but lower than the first threshold higher than the second threshold for a predetermined set period, the second threshold being a magnitude of a voltage lower than a limit voltage that indicates that sensitivity of the gas sensor has been reduced to zero by siloxane poisoning.

Advantageous Effects of Invention

An embodiment of the present invention makes it possible to issue an alarm when a gas sensor approaches the end of its service life due to siloxane poisoning.

DESCRIPTION OF EMBODIMENTS

Embodiment 1

Figure 1:
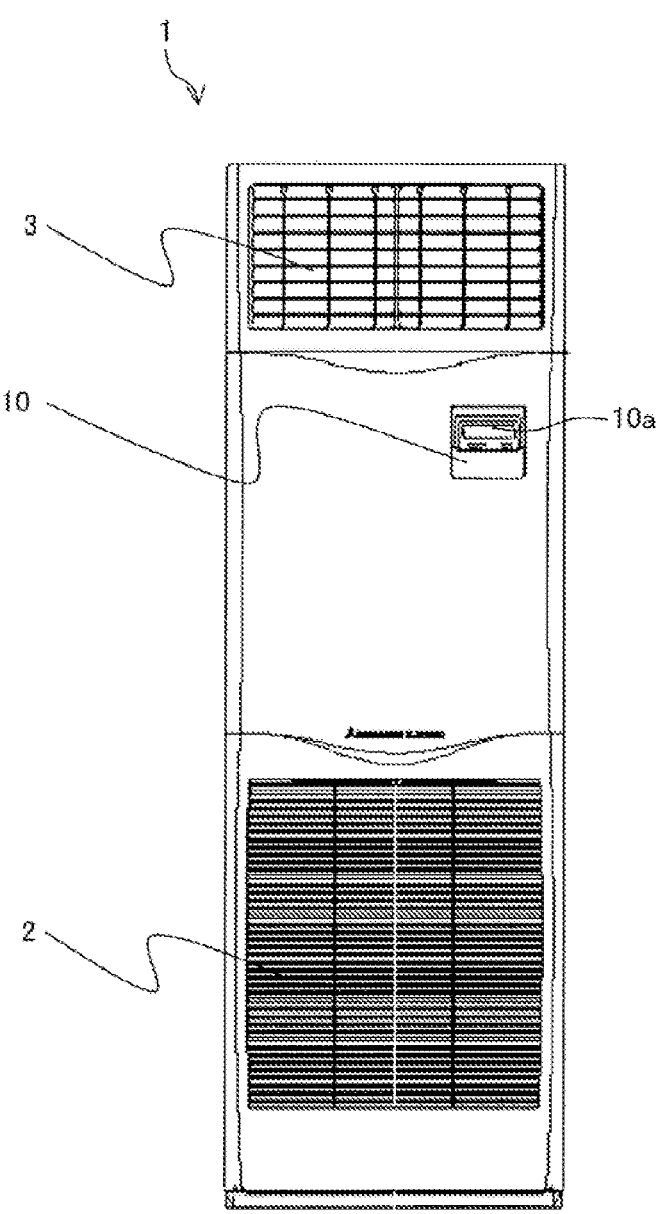
FIG. 1 is a front view showing an external configuration of an air-conditioning apparatus according to Embodiment 1 of the present invention.
Figure 2:
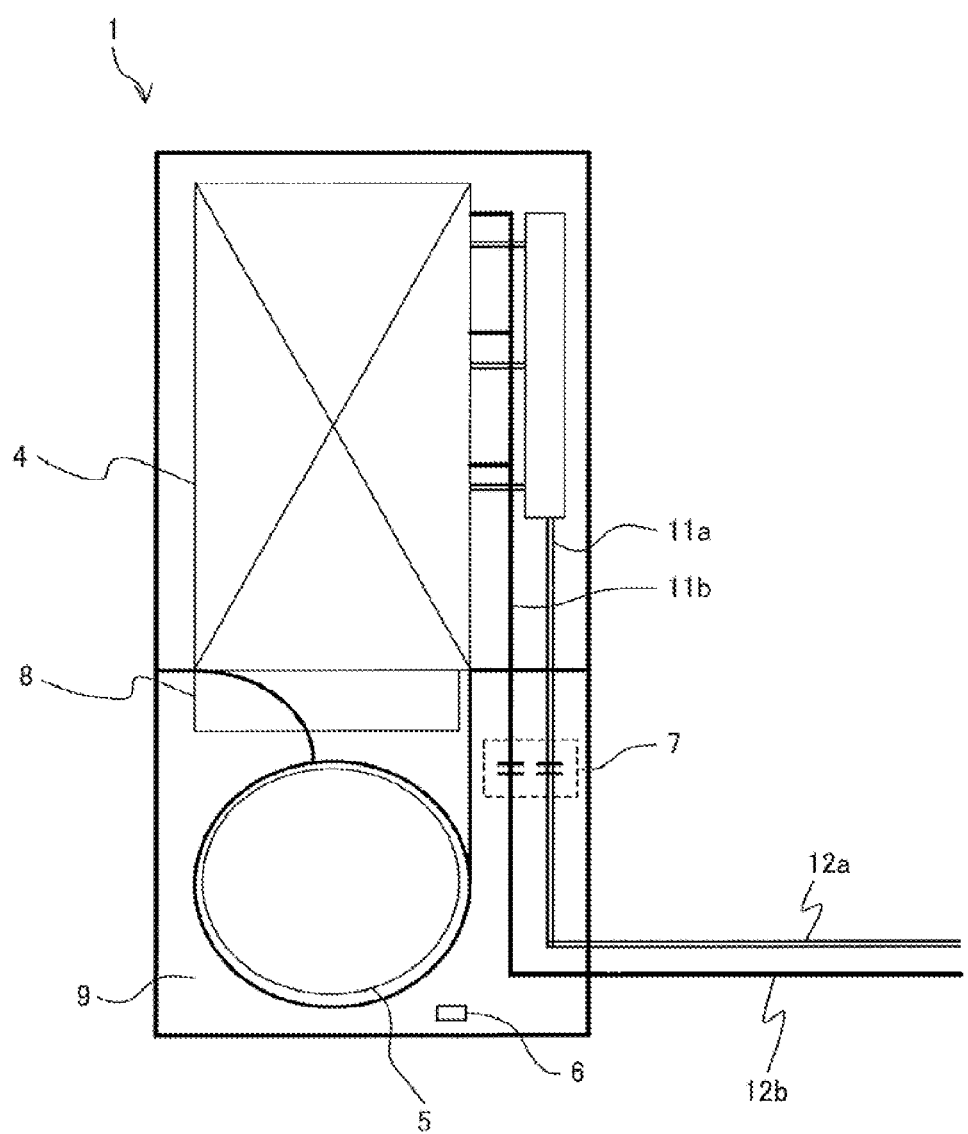
FIG. 2 is a front view schematically showing an internal structure of the air-conditioning apparatus according to Embodiment 1 of the present invention.
Figure 3:
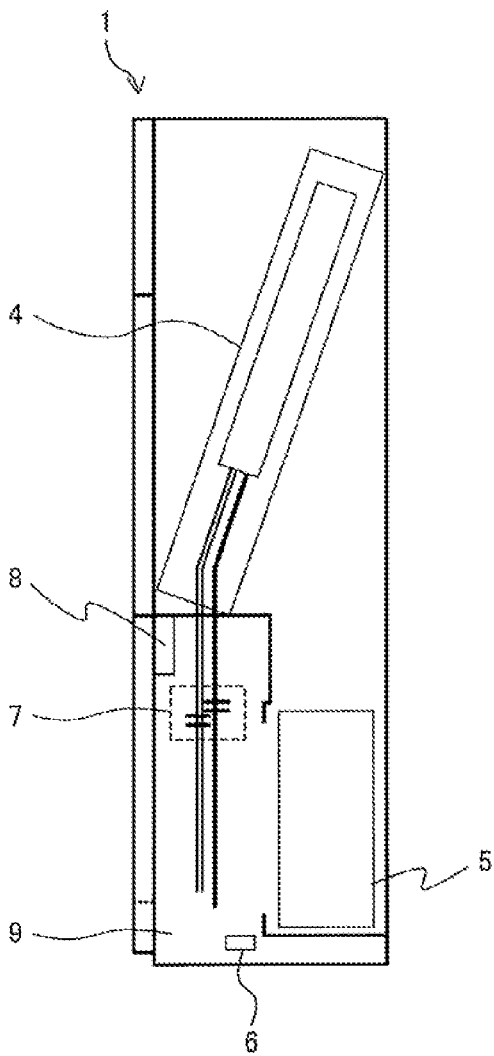
FIG. 3 is a side view schematically showing the internal structure of the air-conditioning apparatus according to Embodiment 1 of the present invention.

FIG. 1 is a front view showing an external configuration of an air-conditioning apparatus according to Embodiment 1 of the present invention. FIG. 2 is a front view schematically showing an internal structure of the air-conditioning apparatus according to Embodiment 1 of the present invention. FIG. 3 is a side view schematically showing the internal structure of the air-conditioning apparatus according to Embodiment 1 of the present invention. In Embodiment 1, a floor standing air conditioner placed on a floor surface in an indoor space, which is an air-conditioned space, will be described as an example of air conditioner, but the present invention is not limited to this and is applicable to wall-mounted air conditioners and ceiling concealed air conditioners. Note that the following description of positional relationships among components (e.g., a vertical positional relationship) assumes that the air conditioner is installed in a ready-for-use condition.

In a casing 1 of the air conditioner, an air inlet 2 is provided in lower front part and an air outlet 3 is provided in upper front part. Besides, a remote control 10 is placed on a front face of the casing 1. A heat exchanger 4, fan 5, gas sensor 6, flare 7, controller 8, and other components are placed inside the casing 1. The air-conditioning apparatus is designed to suck indoor air through the air inlet 2 by driving the fan 5, move the sucked air to upper part of the casing 1 using the fan 5, heat-exchange the air with refrigerant using the heat exchanger 4, and blow out the air into the room through the air outlet 3.

In the air-conditioning apparatus, the heat exchanger 4 makes up a refrigerant circuit in conjunction with a compressor, outdoor heat exchanger, and decompressor (none is shown), and the air-conditioning apparatus cools and/or heats the indoor space as refrigerant circulates through the refrigerant circuit.

Flammable refrigerant such as R32 is used as the refrigerant. Should flammable refrigerant leak into the room, the refrigerant will not ignite if refrigerant concentration in the space is low. A lower limit concentration below which flammable refrigerant does not ignite will be referred to herein as an ignitable concentration. When calculated at ambient temperature of 25 degrees C., with the molecular weight of R32 being 52, the ignitable concentration of R32 is 0.3 [kg/m$^3$], which is translated into a volume ratio of 14.4. Note that besides R32, refrigerants available for use include mildly flammable refrigerants such as R1234yf and R1234ze(E), highly flammable refrigerants such as R290 and R1270, and non-flammable refrigerants such as R22 and R410A having non-flammability.

The remote control 10 includes a display device 10a made up of a liquid crystal panel or other similar device and an input device (not shown) used to enter a setting temperature.

The flare 7 is used for pipe connection work at an installation site of the air-conditioning apparatus by installation workers. Specifically, the flare 7 is made up of a flare joint used to connect indoor pipes 11a and 11b, which are connected to the heat exchanger 4, with extension pipes 12a and 12b located outside the casing 1. If refrigerant leaks, for example, through the flare 7 due to installation mistakes or the like, the refrigerant, which has a higher specific gravity than air, collects in a stagnation space 9, which is a lower space inside the casing 1. The refrigerant collected in the stagnation space 9 eventually overflows into the room through the air inlet 2.

The gas sensor 6 is placed in the stagnation space 9 and produces sensor output [V], which is a voltage corresponding to the refrigerant concentration. The gas sensor 6 is, for example, a semiconductor gas sensor such as a $SnO_2$ (tin oxide) sensor. The gas sensor 6 will be described in detail later.

The controller 8 controls the entire air-conditioning apparatus. The controller 8 is made up, for example, of a microcomputer, and is equipped with a CPU, RAM, ROM and other components. The ROM stores a control program, a program corresponding to a flowchart of FIG. 5 described later, and other programs.

Sensor outputs from the gas sensor 6 are inputted sequentially to the controller 8, for example, every minute. Based on the inputs, the controller 8 checks for refrigerant leakage, detects whether the gas sensor 6 is approaching the end of its service life due to siloxane poisoning, and detects any sensor failure. Note that a condition in which "the gas sensor 6 is approaching the end of its service life" will be referred to hereinafter as "expiration-approaching of service life" in the sense that there is still some time before the gas sensor 6 reaches the end of its service life.

Next, a principle of refrigerant leakage detection in a tin oxide sensor making up the gas sensor 6 will be described.

Atmospheric oxygen is adsorbed to surfaces of a tin oxide sensor element due to passage of electric current. Now, when refrigerant gas, which is a reducing gas, approaches the sensor element, the tin oxide surfaces are deprived of oxygen, i.e., a reduction reaction occurs, and resistance of the sensor element falls. Consequently, sensor output (voltage) increases. Refrigerant leakage can be detected based on a phenomenon in which voltage increases when refrigerant gas approaches the sensor element in this way. Specifically, refrigerant leakage is determined as being detected when the sensor output is equal to or higher than a predetermined first threshold but lower than a third threshold described later. Here, the first threshold corresponds to a magnitude of voltage corresponding to an alarm-issuing concentration lower than the ignitable concentration. There is no particular limit to how much lower the alarm-issuing concentration is set than the ignitable concentration, but the alarm-issuing concentration is set, for example, to about 0.01% the ignitable concentration.

A feature of Embodiment 1 is that expiration-approaching of service life of the gas sensor 6 resulting from siloxane poisoning is detected based on the sensor output of the gas sensor 6 and an alarm is outputted, prompting replacement or the like before the gas sensor 6 reaches the end of its service life.

Next, a principle of determining expiration-approaching of service life resulting from siloxane poisoning will be described.

Figure 4:
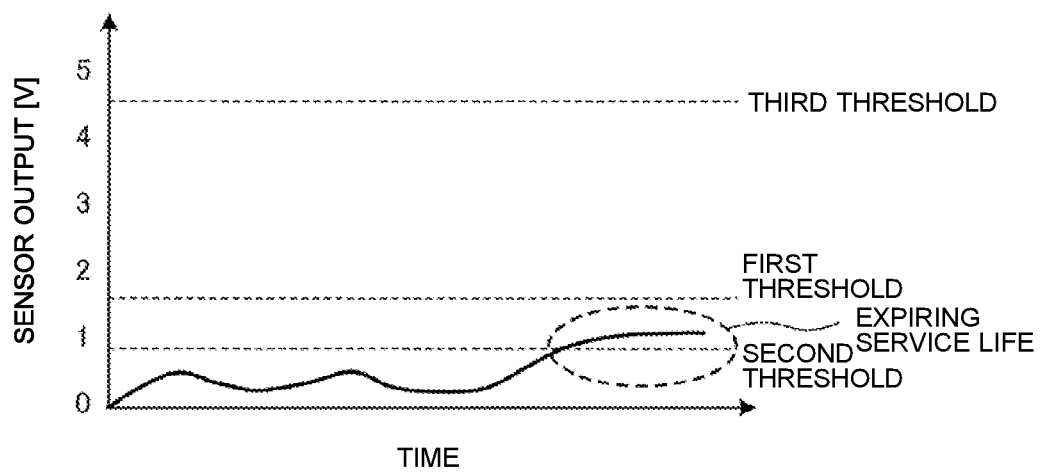
FIG. 4 is a diagram showing changes in sensor output caused by siloxane poisoning in the air-conditioning apparatus according to Embodiment 1 of the present invention.

FIG. 4 is a diagram showing changes in sensor output caused by siloxane poisoning in the air-conditioning apparatus according to Embodiment 1 of the present invention. In FIG. 4, the abscissa represents time and the ordinate represents sensor output [V]. FIG. 4 shows sensor output in normal times without refrigerant leakage.

In a siloxane environment, a Si group of the siloxane reacts with tin oxide of the sensor element and adheres to tin oxide surfaces as $Si+O_2=SiO_2$. The part adhering to the tin oxide surfaces and forming $SiO_2$ was adsorbing oxygen before the adhesion, but can no longer adsorb oxygen after the change from tin oxide into $SiO_2$. This decreases the resistance of the sensor element. Thus, even when there is no refrigerant around the sensor element, the sensor output [V] increases as when there is refrigerant. This phenomenon is referred to as siloxane poisoning.

In the part forming $SiO_2$ on the tin oxide surfaces, the Si group does not separate again from the tin oxide surfaces unless heat in excess of 1,000 degrees C. is provided. The gas sensor 6 includes a sensing unit having a tin oxide sensor element and a heating unit configured to heat the sensing unit, which is used by being heated to about 400 degrees C. In this way, since the temperature of the sensing unit is about 400 degrees C. and does not exceed 1,000 degrees C., the Si group once attaching to the tin oxide surfaces does not separate from the tin oxide surfaces. Thus, even if the siloxane environment is improved, the siloxane poisoning continues to be, and the gas sensor 6 is not restored to the state existing before the siloxane poisoning. Consequently, as shown in FIG. 4, the sensor output in normal times increases gradually as the siloxane poisoning progresses.

Then, as the siloxane poisoning further progresses and the gas sensor 6 reaches the end of its service life, sensitivity becomes zero. That is, the entire tin oxide surfaces are covered with $SiO_2$, being rendered incapable of adsorbing oxygen, and remain free of oxygen. In this way, when the tin oxide surfaces are free of oxygen, even if refrigerant leakage occurs, there is no oxygen to be removed from the tin oxide surfaces by reacting with the refrigerant. Therefore, when the tin oxide surfaces become free of oxygen, the resistance of the sensor element falls to a limit value. As a result, the sensor output continues to be up at a limit voltage. That is, regardless of whether or not there is refrigerant leakage, the sensor output continues to be at the limit voltage, no longer functions as a sensor, and shows zero sensitivity.

In this way, when the gas sensor 6 reaches the end of its service life due to siloxane poisoning, the gas sensor 6 continues to output the limit voltage higher than the sensor output in normal times. According to Embodiment 1, to determine expiration-approaching of service life before the gas sensor 6 reaches the end of its service life, a voltage lower than the limit voltage is set as a second threshold for use to determine siloxane poisoning.

Note that because the limit voltage does not reach or exceed the sensor output produced when refrigerant leakage occurs, siloxane poisoning can be distinguished from refrigerant leakage based on the sensor output. That is, in the case of siloxane poisoning, since a sensor output lower than in the case of refrigerant leakage continues to be produced, expiration-approaching of service life can be determined by detecting the sensor output. Specifically, when a sensor output equal to or higher than the second threshold but lower than the first threshold continues for a predetermined set period, the controller 8 determines expiration-approaching of service life. It is recommended that the set period is from one hour to a few days. This is intended to avoid a situation such as the following: if the set period is, for example, from about a few seconds to a few minutes, an event in which, for example, hair spray is temporarily emitted near the gas sensor 6, temporarily increasing the sensor output, may be misdetected as expiration-approaching of service life.

A concrete determination process of the controller 8 based on the sensor output from the gas sensor 6 will be described below. The controller 8 prestores the first to third thresholds for use to identify expiration-approaching of service life resulting from siloxane poisoning, refrigerant leakage, and a sensor failure, respectively, and makes determinations based on these thresholds. The first and second thresholds are as described above. The third threshold is a maximum value in an output range including dispersion caused when there is refrigerant leakage and is also a threshold used in determining whether or not there is a sensor failure. The first to third thresholds have the following relationship: second threshold<first threshold<third threshold.

The first to third thresholds can be calculated from test results or simulation results. As characteristics of the gas sensor 6, it is assumed, for example, that the sensor output range in the absence of refrigerant leakage, i.e., the sensor output range in normal times is, for example, in a range of 0.2 V to 1.0 V including dispersion. Also, it is assumed that the sensor output in the case where the concentration detected by the gas sensor 6 reaches an alarm-issuing concentration, i.e., in the case of refrigerant leakage is, for example, in a range of 1.5 V to 4.5 V including dispersion. Besides, it is assumed that the limit voltage is, for example, 1.5 V when the gas sensor 6 eventually reaches the end of its service life with the progress of siloxane poisoning. With the gas sensor 6 having these characteristics, the first threshold is set to 1.5 V, the second threshold is set to 1.0 V, and the third threshold is set to 4.5 V.

By the way, the determination of expiration-approaching of service life is necessary when the air-conditioning apparatus is used in a siloxane environment, but unnecessary when the air-conditioning apparatus is used in a non-siloxane environment. Therefore, when the air-conditioning apparatus is used in a non-siloxane environment, normal condition, refrigerant leakage, and sensor failure can be determined using the first and third thresholds. Specifically, when the sensor output is lower than the first threshold, it can be determined that the gas sensor 6 is normal; when the sensor output is equal to or higher than the first threshold but lower than the third threshold, it can be determined that there is refrigerant leakage; and when the sensor output is equal to or higher than the third threshold, it can be determined that there is a sensor failure. Thus, in the air-conditioning apparatus of Embodiment 1, the controller 8 is provided with a dip switch (not shown) to allow a setting to be switched between a determination process for a siloxane environment and a determination process for a non-siloxane environment. This allows installation workers to make a dip switch setting according to an installation environment of the air-conditioning apparatus and thereby make a determination suitable for the installation environment. Note that the dip switch corresponds to a switching device according to the present invention. Besides, the switching device may be configured to switch settings, for example, through operation of a remote control.

Figure 5:
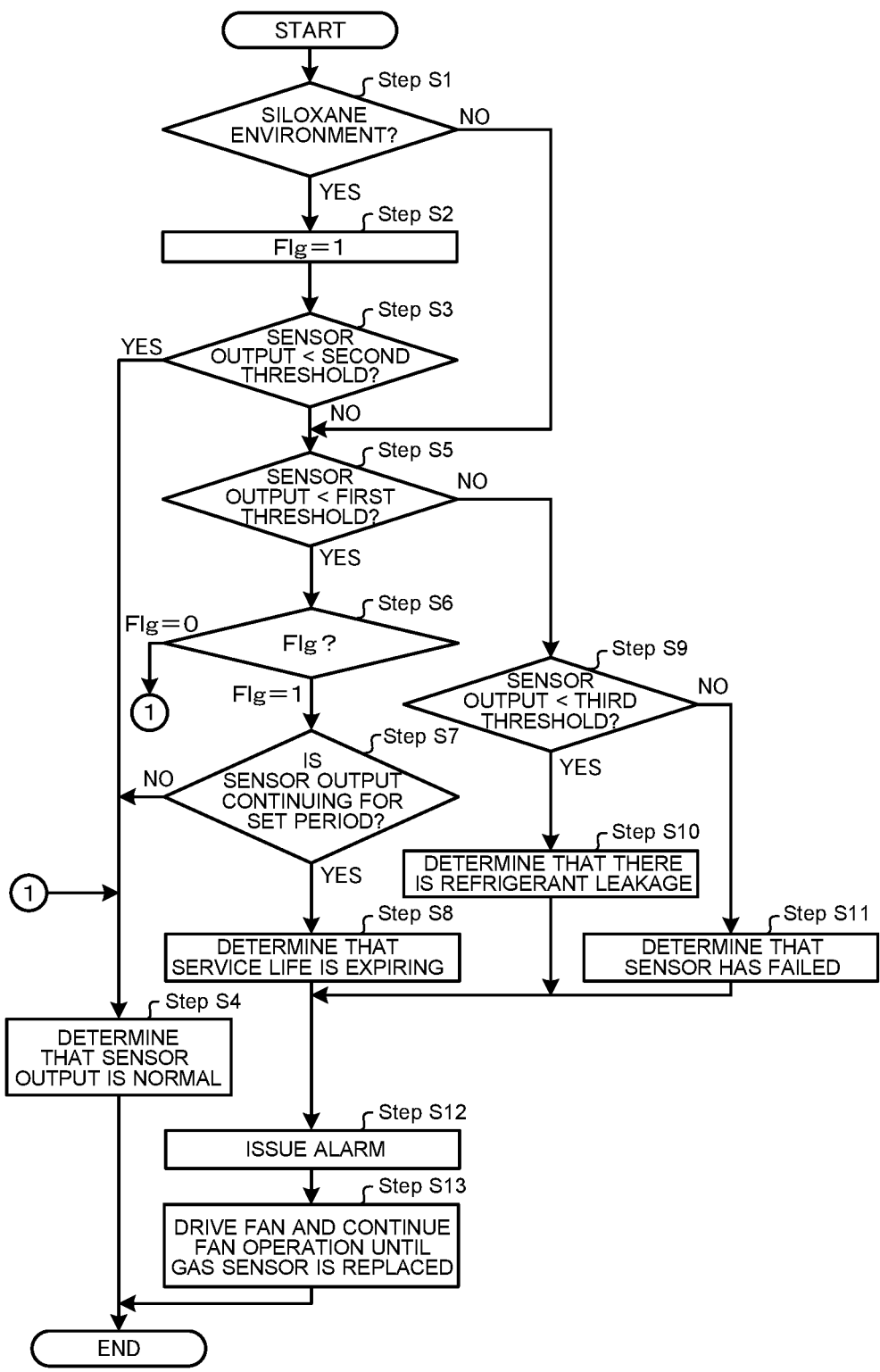
FIG. 5 is a flowchart showing a flow of a determination process based on the sensor output from a gas sensor in the air-conditioning apparatus according to Embodiment 1 of the present invention.

FIG. 5 is a flowchart showing a flow of a determination process based on the sensor output from the gas sensor in the air-conditioning apparatus according to Embodiment 1 of the present invention.

The controller 8 checks the dip switch setting (not shown) to see whether the installation environment of the air-conditioning apparatus is in a siloxane environment (step S1). Here, when the installation environment of the air-conditioning apparatus is a siloxane environment (YES in step S1), the controller 8 sets Flg to 1 from 0 (step S2). Consequently, the determination process for a siloxane environment is performed subsequently. Note that Flg is a flag that is set to 0 in the case of a non-siloxane environment, and to 1 in the case of a siloxane environment. It is assumed that an initial setting is 0.

Next, the controller 8 checks whether the sensor output from the gas sensor 6 is lower than the second threshold (step S3). When the sensor output from the gas sensor 6 is lower than the second threshold (YES in step S3), the controller 8 determines that the sensor output is normal (step S4). When the sensor output from the gas sensor 6 is equal to or higher than the second threshold but lower than the first threshold (NO in step S3 and YES in step S5), next the controller 8 checks Flg (step S6). Here, since Flg is set to 1, it is determined next whether the sensor output is continuing for a set period (step S7). When the determination in step S7 is YES, the controller 8 determines that siloxane poisoning has progressed, resulting in expiration-approaching of service life (step S8).

On the other hand, when the sensor output from the gas sensor 6 is equal to or higher than the first threshold but lower than the third threshold (NO in step S5 and YES in step S9), the controller 8 determines that there is refrigerant leakage (step S10). When the sensor output from the gas sensor 6 is equal to or higher than the third threshold (NO in step S9), the controller 8 determines that the sensor has failed (step S11).

When the determinations are completed in the above manner, if any of the determination results is other than normal, the controller 8 outputs an alarm to the display device 10*a* of the remote control 10 (step S12), notifying the user. Regarding an alarm output, a message may be displayed showing content of determination results or in the case of expiration-approaching of service life or sensor failure, a message may be displayed prompting the user to replace the gas sensor 6. Also, an output method is not limited to displays on the display device 10*a*, and, for example, voice may be outputted from a voice output device or an indicator such as an LED may be lighted.

Then, if any of the determination results is other than normal, i.e., if the sensor output is equal to or higher than the second threshold, the controller 8 drives the fan 5 and continues operation of the fan 5 until the gas sensor 6 is replaced (step S13). Note that the determination as to whether the gas sensor 6 has been replaced can be made as follows. The gas sensor 6 includes a sensor substrate (not shown), and a "Normal" signal continues to be sent to the controller 8 from the sensor substrate when the gas sensor 6 is working normally. Then, once the gas sensor 6 becomes abnormal, an "Abnormal" signal continues to be sent to the controller 8 from the sensor substrate. Therefore, when a "Normal" signal is received after an "Abnormal" signal, the controller 8 determines that the sensor has been replaced.

Next, when the installation environment of the air-conditioning apparatus is a non-siloxane environment, the determination in step S1 is NO, and the controller 8 makes a determination in step S5 with Flg being kept at the initial setting of 0. That is, the controller 8 does not make the determination in step S3 using the second threshold, and checks whether the sensor output is lower than the first threshold (step S5). When the sensor output is lower than the first threshold, the controller 8 checks Flg next. Since Flg is set to 0 here, the controller 8 determines that the sensor output is normal (step S4). That is, in the non-siloxane environment, the controller 8 determines that the sensor output is normal as long as the sensor output is lower than the first threshold. Note that when the sensor output is equal to or higher than the first threshold, the controller 8 checks for any refrigerant leakage or sensor failure by performing the same process as above.

As described above, according to Embodiment 1, if a state in which the sensor output from the gas sensor 6 is equal to or higher than the second threshold but lower than the first threshold continues for a set period, it can be determined that the gas sensor 6 is approaching to its expiration of service life due to siloxane poisoning. This makes it possible to output an alarm, prompting the user to replace the gas sensor 6, before the sensitivity of the gas sensor becomes zero due to siloxane poisoning. This in turn makes it possible to avoid a situation in which the gas sensor 6 reaches the end of its service life without the user realizing it, refrigerant leakage continues to be undetected, and no alarm is issued.

Also, since an alarm indicating refrigerant leakage is outputted from the display device 10a when the sensor output from the gas sensor 6 is equal to or higher than the first threshold but lower than the third threshold, the user can be notified of any refrigerant leakage.

Also, since an alarm indicating a sensor failure is outputted from the display device 10a when the sensor output from the gas sensor 6 is equal to or higher than the third threshold, the user can be notified of any sensor failure.

Also, since the controller 8 drives the fan 5 and continues operation of the fan 5 until the gas sensor 6 is replaced when the sensor output from the gas sensor 6 is equal to or higher than the second threshold, the refrigerant concentration in the space can be kept below the ignitable concentration, ensuring safety.

Note that as a factor causing deterioration of the gas sensor 6, description has been given herein by centering on siloxane poisoning, which is an environmental stress, but there are other such factors including aging deterioration. When the refrigerant concentration in the space is at an alarm-issuing concentration, whereas the sensor output is, for example, 2 V in brand new conditions upon shipment, if the gas sensor 6 deteriorates over time, the sensor output falls, for example, to 1.5 V due to aging deterioration. This phenomenon is opposite to the phenomenon in which the sensor output increases due to siloxane poisoning. Since both deterioration due to siloxane poisoning and aging deterioration act on the gas sensor 6, it is necessary to determine expiration-approaching of service life by considering both types of deterioration. Actually, however, because the sensor element of the gas sensor 6 is more susceptible to siloxane poisoning than to aging deterioration, the expiration-approaching of service life can be determined by sufficient accuracy by the determination method described so far.

Refrigerant leakage detection in consideration of aging deterioration of the gas sensor 6 is outside the scope of the present invention, and a conventionally known technique may be adopted. In any case, refrigerant leakage can be detected by comparing the sensor output from the gas sensor 6 with the first threshold used to check for refrigerant leakage.

Also, to make sure to prevent false detection of expiration-approaching of service life, the false detection being caused by temporarily being exposed to emission of hair spray or another similar event, the following verification may be made further. That is, after determination of expiration-approaching of service life, by operating the fan 5 for a predetermined period, it may be verified that the sensor output still continues to be equal to or higher than the second threshold but lower than the first threshold even after the fan operation.

Also, the concrete numeric values of the sensor output and time described above are merely exemplary, and can be set as appropriate according to actual operating conditions and other conditions.

REFERENCE SIGNS LIST

1 casing 2 air inlet 3 air outlet 4 heat exchanger 5 fan 6 gas sensor 7 flare 8 controller 9 stagnation space 10 remote control 10a display device 11a indoor pipe 11b indoor pipe 12a extension pipe 12b extension pipe

The invention claimed is:
1. An air-conditioning apparatus comprising:
a casing;
a gas sensor placed in the casing and configured to produce a sensor output according to refrigerant concentration;
a controller configured to detect refrigerant leakage by comparing the sensor output from the gas sensor with a first threshold used to check for refrigerant leakage; and
a fault alarm configured to issue an alarm indicator, wherein
the controller causes the fault alarm to issue the alarm indicator when the sensor output from the gas sensor continues to be equal to or higher than a second threshold but lower than the first threshold higher than the second threshold for a predetermined set period, the second threshold being a magnitude of a voltage lower than a limit voltage that indicates that sensitivity of the gas sensor has been reduced to zero by siloxane poisoning, and
the controller causes the fault alarm to issue the alarm indicator indicating refrigerant leakage when the sensor output from the gas sensor is equal to or higher than the first threshold but lower than a third threshold higher than the first threshold.

2. The air-conditioning apparatus of claim 1, wherein the alarm indicator prompts replacement of the gas sensor.

3. The air-conditioning apparatus of claim 1, wherein the controller causes the fault alarm to issue the alarm indicator indicating a sensor failure when the sensor output from the gas sensor is equal to or higher than the third threshold.

4. The air-conditioning apparatus of claim 1, further comprising a fan placed in the casing, wherein the controller drives the fan when the sensor output from the gas sensor is equal to or higher than the second threshold and continues operation of the fan until the gas sensor is replaced.

5. The air-conditioning apparatus of claim 1, further comprising a switching device configured to switch a determination process performed by the controller to determine whether to issue the alarm indicator between a determination process for a siloxane environment and a determination process for a non-siloxane environment, wherein in the determination process for a non-siloxane environment, the controller causes the output device to issue the alarm indicator when the sensor output from the gas sensor is equal to or higher than the first threshold.

6. The air-conditioning apparatus of claim 1, wherein the alarm indicator comprises at least one of an image on a display panel, an audio output, and a visual emission from a light.

* * * * *